United States Patent
Inhoff et al.

(10) Patent No.: US 9,109,973 B2
(45) Date of Patent: Aug. 18, 2015

(54) TEST WHEEL ARRANGEMENT WITH ROTARY MOUNTING BLOCKING DEVICE

(75) Inventors: Andreas Inhoff, Steinmauern (DE);
Ullrich Hesse, Affalterback (DE);
Walter Zipp, Baden-Baden (DE)

(73) Assignee: IPETRONIK GmbH & Co. KG, Baden-Baden (DE)

( * ) Notice: Subject to any disclaimer, the term of this patent is extended or adjusted under 35 U.S.C. 154(b) by 143 days.

(21) Appl. No.: 13/634,770

(22) PCT Filed: Apr. 12, 2011

(86) PCT No.: PCT/EP2011/055707
§ 371 (c)(1),
(2), (4) Date: Sep. 13, 2012

(87) PCT Pub. No.: WO2011/131514
PCT Pub. Date: Oct. 27, 2011

(65) Prior Publication Data
US 2013/0025355 A1    Jan. 31, 2013

(30) Foreign Application Priority Data

Apr. 22, 2010   (DE) .......................... 10 2010 016 587

(51) Int. Cl.
*G01M 17/013* (2006.01)
*G01M 17/007* (2006.01)

(52) U.S. Cl.
CPC ........ *G01M 17/007* (2013.01); *Y10T 29/49492* (2015.01)

(58) Field of Classification Search
CPC .................................................. G01M 17/013
USPC ............... 73/115.01, 115.07, 115.08, 117.01, 73/118.01
See application file for complete search history.

(56) References Cited

U.S. PATENT DOCUMENTS

2010/0122574 A1*  5/2010  Goto et al. ................. 73/117.01
2013/0298680 A1*  11/2013 Inoue et al. .................... 73/593

FOREIGN PATENT DOCUMENTS

| DE | 3507906 A1 | 9/1986 |
| DE | 4136508 A1 | 5/1993 |
| DE | 19960737 A1 | 7/2001 |
| DE | 102008006870 A1 | 8/2009 |
| EP | 0018960 A2 | 11/1980 |
| EP | 2187193 A2 | 5/2010 |

OTHER PUBLICATIONS

International Preliminary Report on Patentability of the Patent Cooperation Treat Office in International application No. PCT/EP2011/055707 dated Nov. 1, 2012.
Search Report issued by the German Patent and Trademark Office in application No. 102010016587.5, dated Feb. 4, 2011.
International Search Report issued by the European Patent Office in application No. PCT/EP2011/055707, dated Jul. 14, 2011.
International Search Report of the European Patent Office in Application No. PCT/EP2011/055707 dated Jul. 14, 2011.

\* cited by examiner

*Primary Examiner* — Eric S McCall
(74) *Attorney, Agent, or Firm* — Kinney & Lange, P.A.

(57) ABSTRACT

There is proposed a test wheel arrangement (1) for testing a motor vehicle while the tires are stationary, which test wheel arrangement (1) has a shaft section (5) which can be attached to a wheel hub (7) of a motor vehicle and on which a test wheel (3) is mounted to be freely rotatable.

21 Claims, 13 Drawing Sheets

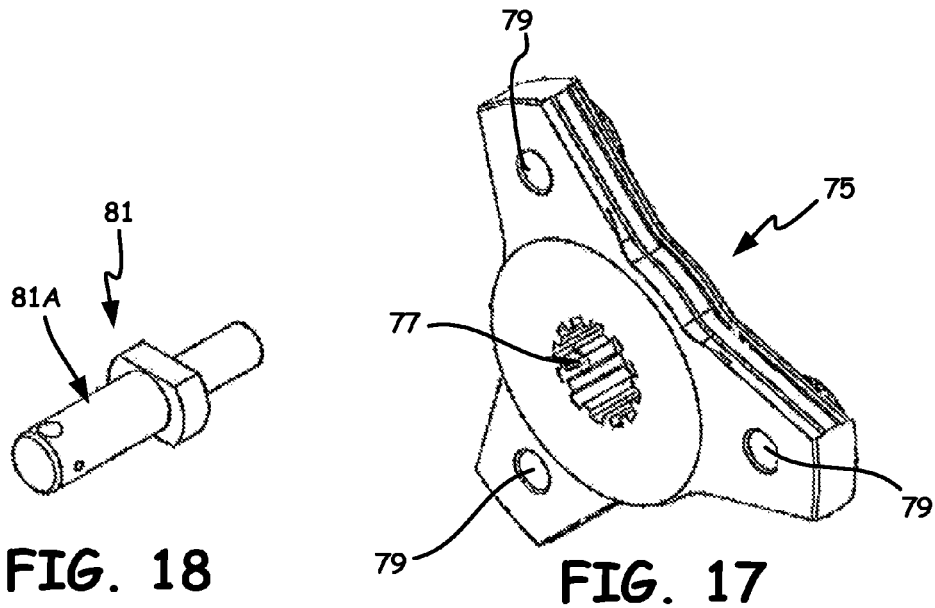
FIG. 18
FIG. 17
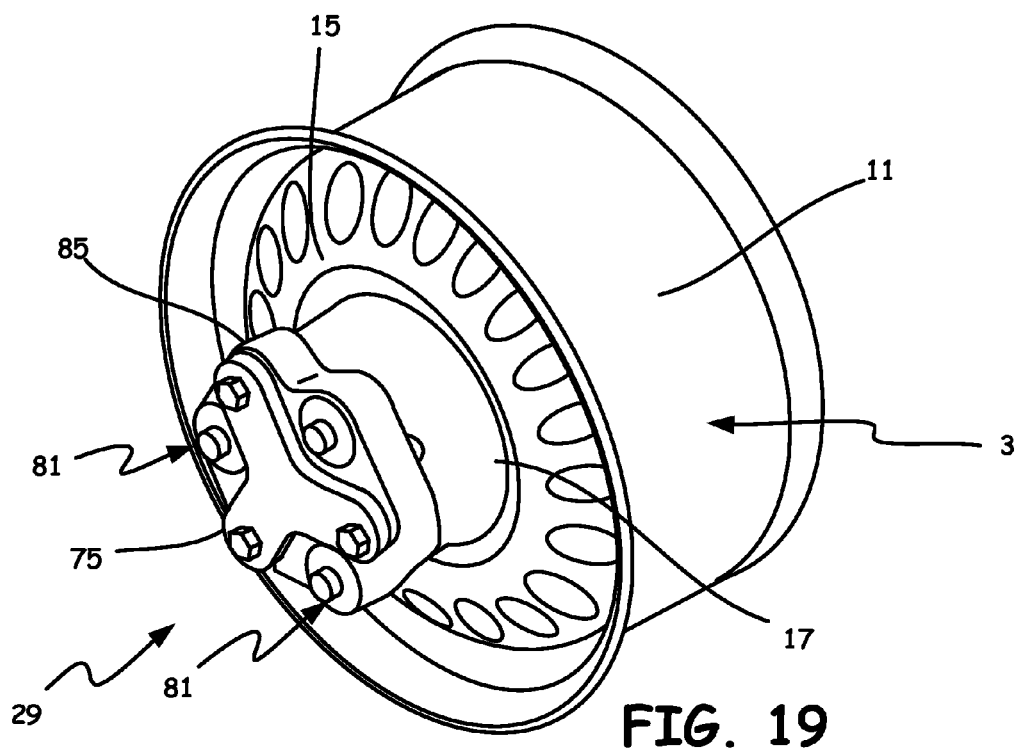
FIG. 19

TEST WHEEL ARRANGEMENT WITH ROTARY MOUNTING BLOCKING DEVICE

BACKGROUND

The invention relates to a test wheel arrangement, to the use of a test wheel arrangement, and to a method for preparing a motor vehicle for the testing of various running properties by way of at least one wheel axle.

Test benches for the testing of vehicles are known from the prior art, which offer numerous advantages as a supplement to road testing. As well as being independent of the weather, operation on a test bench allows measuring devices to be fitted to the vehicle which, on account of their size, their weight or complex wiring, are unsuitable for road travel. A further advantage of such test benches is the reproducibility of the test operation, which can be ensured on the test bench with a higher degree of accuracy than is possible in the case of road travel. By means of the test benches of the type mentioned here it is possible to simulate different driving cycles of a motor vehicle and to measure the overall properties of the vehicle. In particular, the noise produced by the drive chain, such as gears, drive shaft or bearings, can be measured. Furthermore, the longitudinal dynamics of a vehicle, that is to say especially the drive, the brakes, the driving resistance and the consumption, etc., or also the transverse dynamics, that is to say especially the steering, cornering, stability against overturning, etc., can be determined. The acceleration in or about the axles of a motor vehicle can also be determined. Overall, test benches accordingly permit a comprehensive determination of vehicle-specific properties, which are not listed exhaustively here.

Test benches of the known type for vehicle testing conventionally make use of the basic principle of a moving track. For that purpose, in so-called roller test benches there are in most cases provided large rollers, which are fitted in the storey beneath the test space for the vehicle. However, a test bench can also make use of the so-called flat track concept, in which the driving track moves away beneath the vehicle, similarly to a belt grinding machine. It is a disadvantage of the test benches of the above-described type that, in addition to a considerable structural outlay, they require the vehicle to be fixed securely and robustly to the rollers or to the flat track. However, fixing of the vehicle to the test bench generates stresses in the vehicle body and stresses in vehicle components which influence the vibration and transmission behaviour of the vehicle, as a result of which the test results are falsified. A further disadvantage arises in respect of the testing of the vehicle acoustics in order to determine sound emissions of a vehicle. The friction pairing between the tyres of a vehicle to be tested and the test bench covering creates a different rolling noise than is the case with road travel, so that considerable differences in the vehicle acoustics can occur in a roller or flat-track test bench as compared with typical road operation.

SUMMARY

Accordingly, it is an object of the present invention to provide means for vehicle testing which, with only a small structural outlay, support all the applications of a conventional roller and/or flat-track test bench and which avoid falsification of the determined vehicle acoustics by the test bench covering.

In order to achieve the above-mentioned object there is proposed a test wheel arrangement. It has a shaft section which can be attached to a wheel hub of a motor vehicle and on which a test wheel is mounted to be freely rotatable.

Accordingly, a fundamental point of the invention is to provide a test wheel arrangement specifically for vehicle testing, which joins together a test wheel and a shaft section in such a manner that they are movable in rotation so that, during a test operation, the test wheel of a vehicle to be tested is stationary and only the shaft section—driven by suitable drive means—rotates. It is particularly advantageous that, because the test wheels are stationary, the rolling noise conventionally caused by the test bench covering is eliminated. The test wheel arrangement according to the invention can easily be mounted on the vehicle in place of the normal wheels outside the test bench. The shaft section of the test wheel arrangement can then be driven by suitable drive means so that the vehicle can be driven in the typical cycles of a roller test bench but, unlike in the known roller test benches, the test wheels of the vehicle are stationary and only the shaft section fastened to the wheel hub rotates. By means of the set of wheels it is possible in particular to simulate a braking operation and a drag operation under a defined load with variable engine speed and travelling speed.

It is particularly advantageous for the test wheel to be mountable on the shaft section independently of the mounting thereof (of the shaft section) on the wheel hub. Consequently, the shaft section can preferably be mounted on the wheel hub separately from the test wheel so that the test wheel can be mounted on the shaft section only after the shaft section has been mounted on the wheel hub. The two-stage mounting process of the test wheel arrangement permits a substantially more flexible use of the test wheel arrangement because only the shaft section must be adapted for mounting on the wheel hub of a specific vehicle type, while the same test wheel can be used for many different vehicle types. Consequently, a test wheel can be used for almost every vehicle type, while the shaft section can be used vehicle-specifically. Corresponding to a conventional roller or flat-track test bench, a test wheel according to the present invention can consequently be used for different vehicle types, while at the same time undesirable roadway noise is avoided.

The flexible use of the test wheel arrangement can especially be achieved in that the shaft section is part of an adapter which can be attached to the wheel hub and preferably has an adapter plate or similar adapter element. The adapter can then be adapted to almost any desired motor vehicle especially in respect of the bolt circle number of the wheel hub. Where a test wheel is to be used for a specific vehicle type, it is simply necessary to provide a corresponding adapter which has a shaft section and is connected to the wheel hub of the motor vehicle in question, so that problem-free mounting of the test wheel on the shaft section can subsequently take place.

A drive shaft, especially a flexible drive shaft or a universal joint shaft, can preferably be attached to the shaft section so that a rotary connection can be produced. The rotary connection is preferably produced between the shaft section and an external drive unit and/or a braking device, which can set the shaft section in rotary motion or can brake it in order to carry out a test operation of the test wheel arrangement.

The shaft section is preferably connected to the test wheel by way of a roller bearing, especially by way of a ball bearing. It will be appreciated that a freely rotatable mounting between the shaft section and the test wheel can also be achieved by way of a sliding bearing or a similar suitable bearing. The roller bearing is preferably arranged in a wheel disc insert which at least partially replaces the wheel disc of the test wheel. The wheel disc insert can be in multi-part form, and the diameter of the roller bearing within the wheel disc insert can preferably be chosen freely, independently of the diameter of the wheel hub. The degree of freedom in the dimensioning of the bearing is possible only by the shaft section mountable independently of the test wheel, because openings for mounting of the shaft section or of the adapter on the wheel hub do not have to be provided in the wheel disc or in the wheel disc insert. As a result, the dimensions of the bearing can be chosen optimally in respect of the test operation, the stability of the test wheel, etc.

The wheel disc insert preferably has a bearing sleeve, the inside diameter of which is adapted to the diameter of the shaft section so that a clearance fit is produced. To that end, it is preferably provided that, in sections, the shaft section has different diameters in the direction of its longitudinal centre axis, which prevent the shaft section from canting in the bearing sleeve. Because mounting of the shaft section takes place, as mentioned, independently of the mounting of the test wheel on the shaft section, it is important that the test wheel can be mounted on and removed from the shaft section without problems, which is assisted by the use of a clearance fit.

Particular preference is given to a test wheel arrangement which comprises a device for blocking the rotary mounting between the test wheel and the shaft section. In that manner, it is possible to provide a motor vehicle with the test wheel arrangement outside a test area and to drive the motor vehicle into the test area after the test wheel arrangement has been mounted. In that manner it is additionally possible to provide a plurality of vehicles with the test wheel arrangements according to the invention before the test operation, so that the handling of a plurality of vehicles in a test area can take place in an accelerated manner. In an embodiment of the invention, the device for blocking the rotary mounting between the test wheel and the shaft section comprises a resilient intermediate element and a three-armed flange, the resilient intermediate element being connected in a rotationally secure manner to the test wheel, and the three-armed flange being connected in a rotationally secure manner on the one hand to the resilient intermediate element and on the other hand to the shaft section. The resilient intermediate element is preferably arranged concentrically to the shaft section and ensures that misalignments are compensated for, avoids double centreing and cushions impacts. Preferably, the resilient intermediate element is in the form of a flexible disc.

The test wheel arrangement can comprise an integrated electric or hydraulic drive unit, which can be provided alternatively or also in addition to the external drive unit. The drive unit, if it is electric, has a radially internal element and a radially external element, the radially internal element being associated with the shaft section, the adapter or the wheel hub, while the radially external element is connected to the test wheel. Depending on the desired operation of the internal drive unit, either the radially internal or the radially external element can act as the rotor. If the radially external element is used as the rotor, the internal drive unit forms, as it were, a wheel hub motor. If, on the other hand, the radially internal element is used as the rotor, the drive unit can carry out a test operation in that the rotor drives the vehicle axle and/or, in generator operation, energy is fed back by way of the external element, for example into the battery.

It can further be provided that the test wheel arrangement is connected to the drive shaft of the motor vehicle by way of a shiftable coupling. As a result, it is possible, for example, for the vehicle to be driven in driving operation by the drive shaft, or for the internal drive unit to be used as a generator in that the radially internal element is set in rotary motion by the running internal combustion engine by way of the drive shaft.

The test wheel arrangement according to the invention is used specifically for vehicle testing. It joins together a shaft section and a test wheel arranged coaxially thereto in such a manner that they are movable in rotation, so that, during a test operation, the test wheel of a vehicle to be tested is stationary and only the shaft section—driven by suitable drive means—rotates. Conventionally, in each case two test wheel arrangements are associated with at least one vehicle axle. That is to say, therefore, that the two normal wheels associated with an axle are replaced by test wheel arrangements according to the invention. By means of the present invention it is also possible to equip a conventional roller or flat-track test bench for a motor vehicle having a single driven axle (front- or rear-wheel drive) for use for a vehicle having two driven axles (four-wheel drive) in that one axle of the vehicle cooperates with the conventional test bench and the other axle cooperates with two test wheel arrangements according to the invention.

The shaft section of the test wheel arrangement can be set in rotary motion by suitable drive means so that the vehicle can be driven in the typical cycles of a roller test bench, the wheels of the vehicle being stationary and only the shaft section connected to the wheel hub rotating. In particular, it is possible by means of the test wheel arrangement to simulate a braking operation and a drag operation under a defined load with variable engine speed and travelling speed. It will be appreciated that, for the complete testing of a motor vehicle, preferably all four wheels in the case of a passenger car can be replaced by the test wheel arrangement of the type proposed here.

By means of the test wheel arrangement according to the invention it is additionally possible to simulate steering movements. The steering movements are compensated for by suitable connecting shafts to the drive shafts and therefore cannot cause slipping of tyres on a track. Because the vehicle is not fixed to the floor, no stresses are generated on the vehicle structure, so that the vibration and transmission behaviour of the vehicle also does not change. A possibly changed weight and rotational moment of inertia of the multi-part test wheel arrangement can be compensated for by a low mass of the outer rim region and of the tyre. Owing to the rotatable connection between the test wheel and the shaft section, which, as mentioned, is preferably produced by means of a (roller) bearing, noticeable noise formation between the individual parts of the test wheel arrangement is avoided. Moreover, the conventional rolling noise of the tyres on the road or the rollers of a test bench is eliminated. However, in order to achieve complete authenticity of the acoustic conditions of road travel, this can be added in a simple manner by electronic means. In particular, it is accordingly found that noise components that do not occur even during road travel are advantageously not triggered during test bench operation with the test wheel arrangement according to the invention, so that a considerable advantage over conventional test benches is already achieved thereby.

As mentioned, the shaft section is connected to the test wheel preferably by way of a bearing. The bearing can be configured, as a free-wheel element, in such a manner that the test wheel is uncoupled from a rotary movement of the shaft section only when the load conditions change accordingly.

There is preferably associated with a test wheel arrangement according to the invention at least one electric, hydraulic or pneumatic actuator for simulating travel on uneven terrain, that is to say for simulating "rough-road travel". In one embodiment it can be provided that the test wheel, and especially the wheel disc of the test wheel, has two wheel disc parts arranged concentrically to one another, and the actuator is integrated into the test wheel arrangement in such a manner that it can exert a force on at least one of the two parts, so that at least one wheel disc part is displaceable relative to the other wheel disc part. The coupling of force directly into the shaft section is possible as a result. The actuator can accordingly cooperate externally with the test wheel arrangement or can be integrated therein and be in electric, hydraulic or pneumatic form. It is also conceivable to use actuators for simulating "rough-road travel" which couple pulse-like forces into the vehicle by way of the contact surfaces of the tyres. The described arrangement permits rough-road simulation with a drive train running normally, which is not possible with a conventional roller test bench owing to the mass inertia of the rollers. The described concept has a considerable cost advantage over a so-called flat-track test bench.

As mentioned, it is particularly advantageous that the rolling noise conventionally caused by the test bench covering is eliminated as a result of the test wheels' being stationary during test operation. Accordingly, in order to achieve the above-mentioned object, there is also proposed the use of the test wheel arrangement according to the invention for measuring the drive acoustics of a motor vehicle. This is characterised in that the measurement takes place in a wind tunnel, in which the wind noise can optionally be determined separately, in that the engine and aggregate noise is further detected and superimposed on the wind noise, and in that rolling noise (actual or generated by computer simulation) determined separately and independently thereof is optionally added to that noise.

For achieving the above-mentioned object there is also proposed a method for preparing a motor vehicle for the testing of various running properties by way of at least one wheel axle. The method is characterised by the following method steps: removal of a road wheel; attachment of a shaft section to the wheel hub of the motor vehicle, and fastening of a test wheel to the shaft section in such a manner that the test wheel is mounted on the shaft section to be freely rotatable.

With regard to the advantages of the method, reference is made to the above comments relating to the test wheel arrangement. The method can additionally have the further method step: attachment of the shaft section by way of an adapter, especially an adapter plate, to the wheel hub of the motor vehicle, the shaft section forming part of the adapter. It can further be provided that the test wheel is connected to the shaft section by way of a roller bearing, especially a ball bearing. In a further method step, blocking of the rotary mounting between the test wheel and the shaft section can be provided. Finally, the production of a rotary connection between the shaft section and a drive shaft can be provided.

BRIEF DESCRIPTION OF THE DRAWINGS

The invention is explained in greater detail below by means of the drawing, in which:

FIG. 8b shows a schematic sectional representation of the test wheel arrangement according to FIG. 8a;

FIG. 17 shows a perspective representation of a three-armed flange for the device for blocking the rotary mounting between the test wheel and the shaft section;

FIG. 18 shows a perspective representation of a locking pin for fastening a resilient intermediate element of the device for blocking the rotary mounting between the test wheel and the shaft section;

FIG. 19 shows a perspective representation of a device for blocking the rotary mounting between the test wheel and the shaft section in the mounted state.

DETAILED DESCRIPTION

Figure 1:
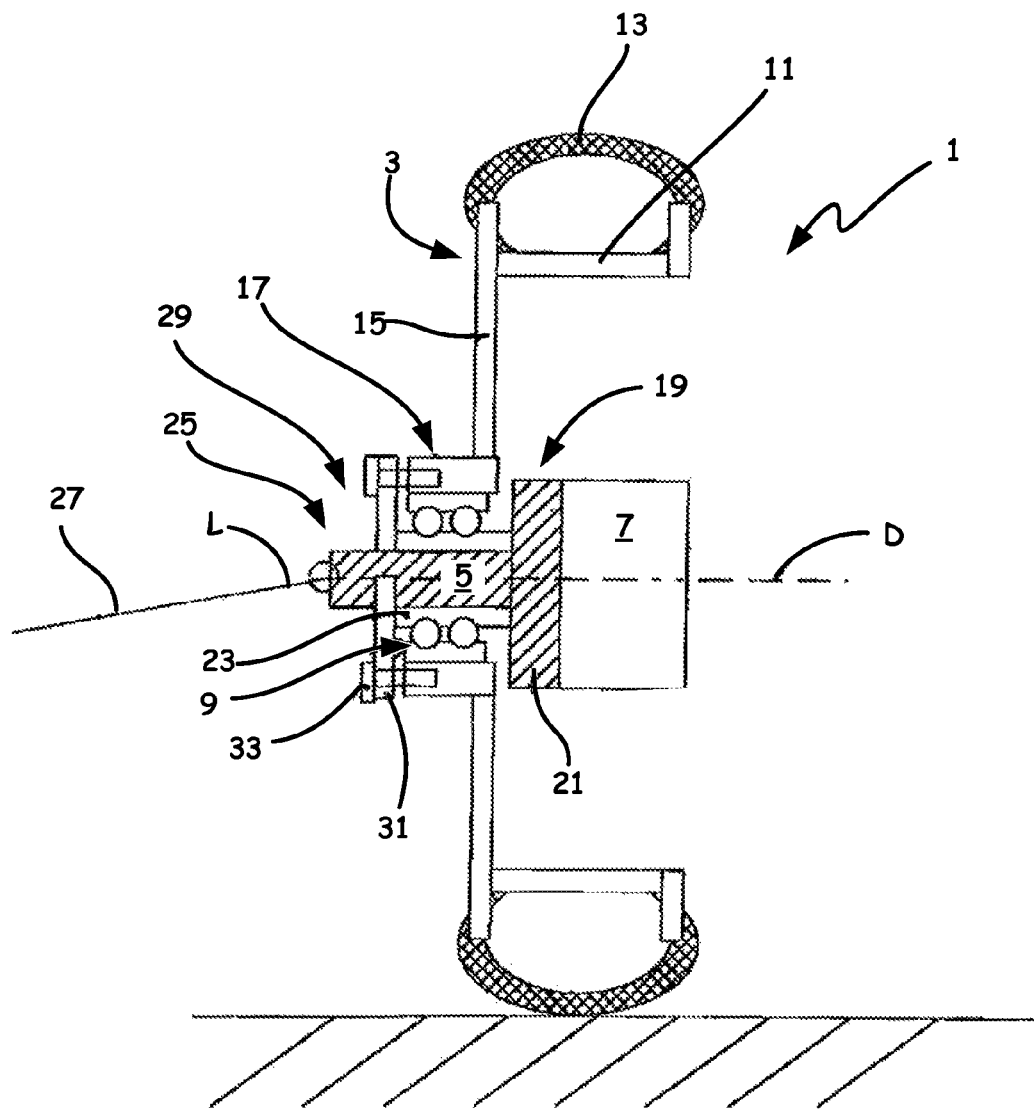
FIG. 1 shows a sectional representation of a test wheel arrangement according to the invention.

FIG. 1 shows a sectional representation of a test wheel arrangement 1 according to the invention. The test wheel arrangement 1 is in multi-part form and has a test wheel 3 and a shaft section 5, which can be attached to the wheel hub 7 (wheel hub flange) of a motor vehicle. The test wheel 3 and the shaft section 5 are connected together in a freely rotatable manner by way of a bearing, the bearing in the present exemplary embodiment being formed by a roller bearing 9 and especially by a ball bearing. It is also conceivable to provide a free-wheel element as the rotatable connection between the shaft section 5 and the test wheel 3. Owing to the rotatable connection between the test wheel 3 and the shaft section 5, which is connected to the wheel hub 7 of a motor vehicle, it is possible during vehicle testing for the test wheel 3 to be stationary, while the shaft section 5 is rotated with the wheel hub 7 in order to simulate driving properties.

The test wheel 3 is in principle produced from a conventional road wheel of a motor vehicle and comprises a rim 11, a tyre 13 and a wheel disc 15. An opening is provided for receiving a wheel disc insert 17, which opening can be introduced into the wheel disc 15 by a suitable operation, especially by punching, laser cutting, mechanical cutting or the like. The wheel disc insert 17 is preferably fixedly connected to the wheel disc 15, especially welded thereto, and serves to receive the roller bearing 9.

In the present exemplary embodiment, the shaft section 5 is part of an adapter 19 which has a substantially T-shaped cross-section and can be attached to the wheel hub 7. For connection to the wheel hub 7 it preferably has, as shown in the figure, a circular adapter plate 21. The adapter plate is connected centrally to an end face of the shaft section 5 in such a manner that the shaft section 5 protrudes substantially perpendicularly from an end face of the adapter plate 21. The longitudinal centre axis L of the shaft section 5 thereby forms, as it were, an extension of the axis of rotation D of the wheel hub 7 and of the vehicle axle connected thereto.

It is particularly advantageous that the test wheel 3 can be mounted on and removed from the shaft section 5 independently of the mounting of the shaft section 5 on the wheel hub 7. The adapter 19 serves to connect the test wheel arrangement 1 to any desired vehicle type. Each adapter 19 is therefore associated with at least one specific vehicle type and is appropriately individually configured. For the mounting of a test wheel arrangement 1 on a vehicle, the original wheel is first removed and the adapter 19 is screwed onto the normal bolt circle of the wheel hub 7 of the vehicle. To that end, the adapter 19 has the corresponding holes according to the vehicle type, and these are thus matched to a corresponding vehicle in terms of size and number. A suitable adapter 19 thus exists for every vehicle type, it being possible for different adapters 19 to be connected to the same test wheel 3.

After mounting of the adapter 19, the test wheel 3 can be mounted on the shaft section 5, especially can simply be pushed onto the shaft section 5. Preferably, the shaft section 5 of the adapter 19 is so matched to the bearing sleeve 23 that the two elements can be connected together in a rotationally secure manner so that a relative movement between them due to the rotational movement of the shaft section 5 is avoided. An axial displacement of the shaft section 5 relative to the bearing sleeve 23 can also be avoided by the use of appropriate means, especially by a shaft nut or the like.

On the other hand, it must be possible for the connection between the shaft section 5 and the bearing sleeve 23 to be released by an operator without the use of considerable force when the test operation is complete, so that the test wheel 3 can be removed. There is suitable for that purpose a clearance fit between the shaft section 5 and the bearing sleeve 23, which clearance fit avoids canting of the two elements. The test wheel 3 can then be removed from the shaft section 5 relatively easily, especially can be "pulled off" the shaft section 5.

The shaft section 5 has a coupling region 25 which can be in the form of, for example, a recess in the end face or alternatively in the form of a (shaft) toothing, and which is used for connection to a drive shaft 27. The drive shaft 27 can be flexible, for example, or, as a universal joint shaft, can be attachable to the shaft section 5, so that a rotary connection can be produced between an external drive unit (not shown in FIG. 1) and the shaft section 5. The drive shaft 27 is consequently connected to a drive unit, by way of which the shaft section 5 and an associated vehicle drive axle can be rotated at a predetermined speed of rotation about the axis of rotation D. Alternatively or in addition, the drive shaft 27 can also be connected to a braking device, which permits braking of the associated vehicle drive axle.

In FIG. 1 there can further be seen a device 29 for blocking the rotary mounting between the test wheel 3 and the shaft section 5. By means of the device 29, a test wheel arrangement can advantageously be mounted onto the vehicle in place of a normal road wheel outside the test bench. The vehicle can then be driven into the test area by means of the normal drive (internal combustion engine), a torque being transmitted from the vehicle axle or vehicle axles (in the case of four-wheel drive) by way of the blocking device to the test wheel 3. As a result of the blocking of the rotatable connection between the test wheel 3 and the shaft section 5 by means of the device 29, the vehicle can thus advantageously shunt and drive into the test bench independently. In the test bench, the test wheels 3 can then be fixed to the floor with safety straps, and only then is the blocking of the rotatable connection between the test wheel 3 and the shaft section 5 at each test wheel arrangement 1 released.

The device 29 for blocking the rotary mounting between the test wheel 3 and the shaft section 5 can be configured in many ways. For example, it is conceivable, as is shown in FIG. 1, to provide a rod-like element 31 which is connected in a rotationally secure manner on the one hand to the test wheel 3 and on the other hand to the shaft section 5 by way of suitable fastening means 33 for transmitting a torque. The rod-like element 31 can especially be arranged in a through-bore extending radially in the shaft section 5, and can then be fastened to the test wheel 3 and especially to the wheel disc insert 17 by the fastening means 33, especially by means of screws or the like. In that manner, a rotary movement between the test wheel 3 and the shaft section 5 is reliably blocked.

Figure 2:
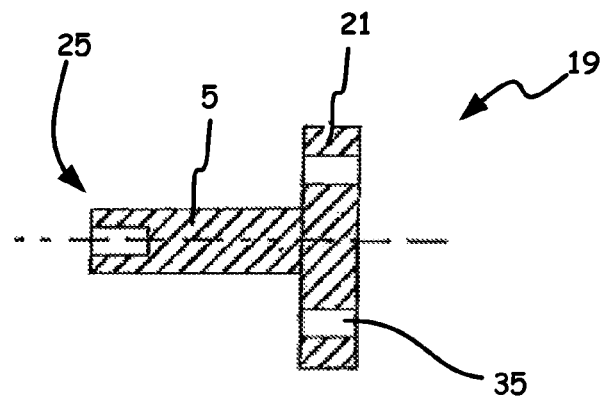
FIG. 2 shows a section through an adapter element.

FIG. 2 shows a schematic sectional representation of the adapter 19 with the shaft section 5. The adapter 19 has an adapter plate 21, which has through-bores 35 for the fastening of the adapter 19 to the wheel hub 7 of a motor vehicle by means of screws. It is clear that, for connection to a drive shaft 27, the coupling region 25 of the adapter 19, or of the shaft section 5, according to the embodiment of FIG. 2 has in the end face a recess in the form of a slot or crossed slot for producing a rotary connection between the shaft section 5 and an external drive unit (not shown in FIG. 2). It will be appreciated that the coupling region 25 can also be configured differently. It is important that the coupling region 25 is so configured that a torque can be transmitted from the drive shaft 27 to the shaft section 5.

Figure 3:
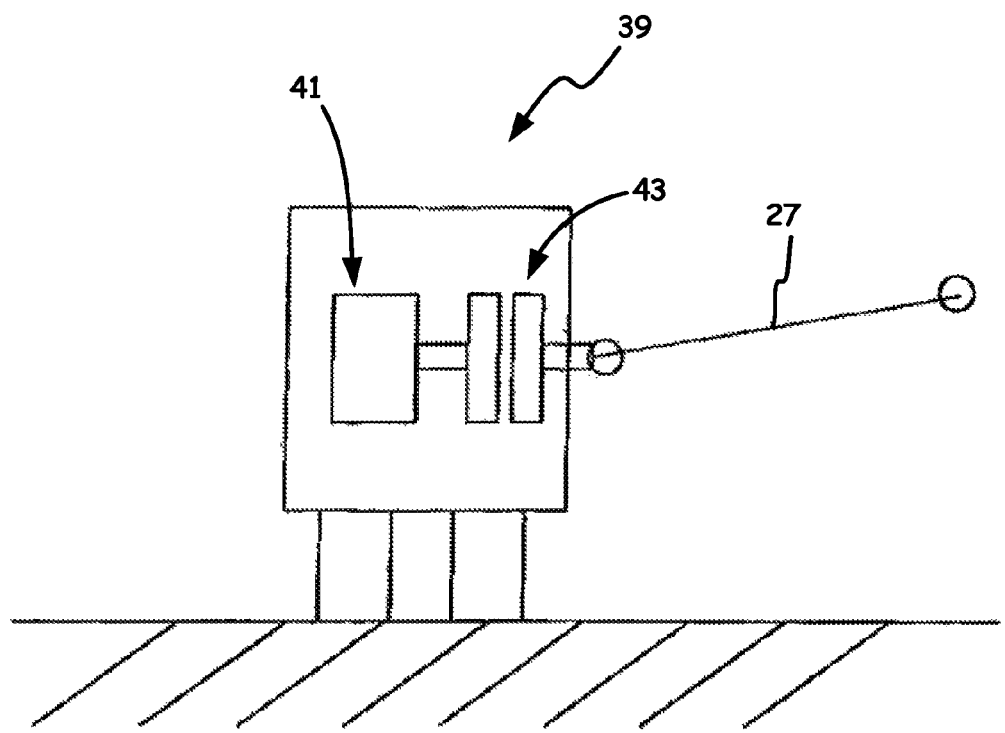
FIG. 3 shows a schematic representation of an external drive unit according to a first embodiment.

FIG. 3 shows a schematic representation of a drive unit 39, which can be connected by means of the drive shaft 27 to a test wheel arrangement 1 and especially to a shaft section 5. The drive unit has an electric motor 41 and a shiftable coupling 43, the electric motor 41 preferably being in the form of an asynchronous motor. The electric motor 41 is connected to a computer and is controlled or adjusted thereby. By means of the computer-assisted control of the electric motor it is possible to simulate driving resistances of the vehicle and to determine correct vehicle properties and other data. The coupling of the drive shaft 27 to the drive unit shown in FIG. 3 is purely exemplary. It can also be provided that, alternatively or in addition to the drive unit, the test wheel arrangement is connected to a braking device.

Figure 4:
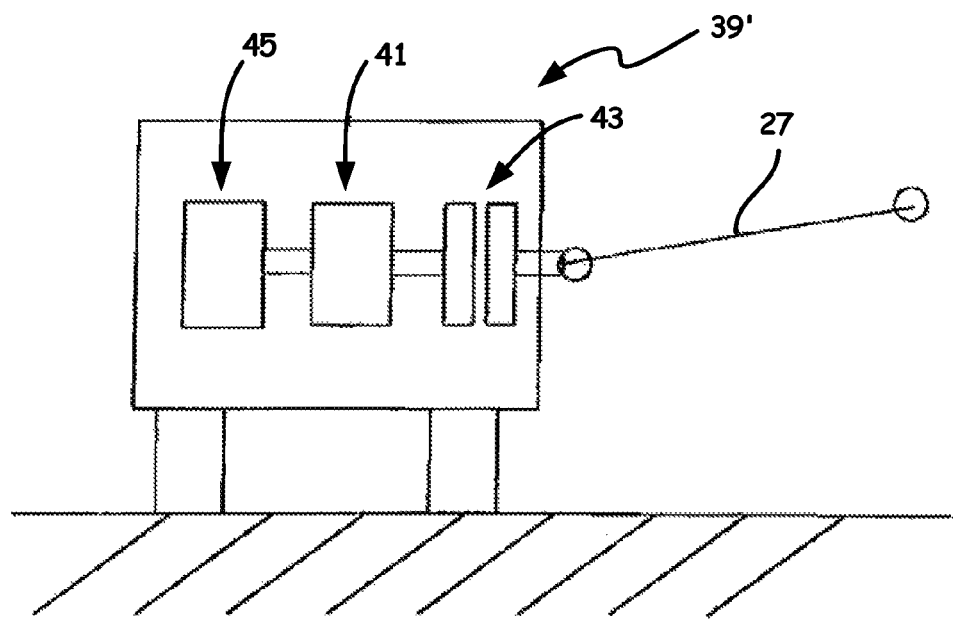
FIG. 4 shows a schematic representation of an external drive unit according to a second embodiment.

FIG. 4 shows a further embodiment of an external drive unit 39', which again comprises an electric motor 41 and a shiftable coupling 43. In this embodiment, however, there is additionally provided a braking device, especially an eddy-current brake 45, which permits braking operation so that defined loads acting on the motor vehicle can thus be simulated. The eddy-current brake 45 consequently serves to brake the electric motor 41.

Figure 5:
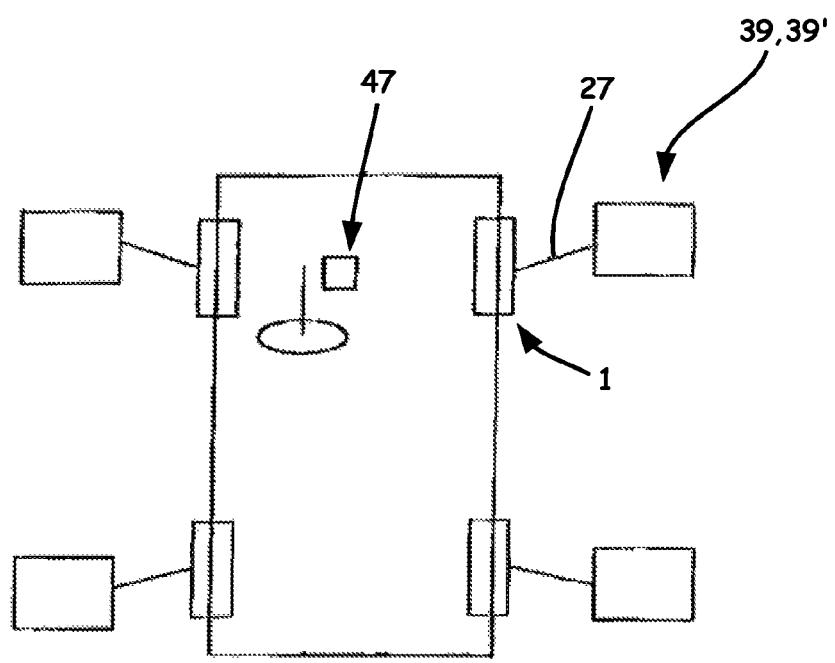
FIG. 5 shows a schematic top view of a vehicle having four test wheel arrangements and drive units connected thereto.

For carrying out a test operation, the two road wheels of a motor vehicle associated with a drive axle are replaced with test wheel arrangements 1 according to the invention. In a motor vehicle with four-wheel drive, it is also possible to provide that all four road wheels of the motor vehicle are each replaced with a test wheel arrangement 1 according to the invention, as is shown in FIG. 5.

A drive unit 39 or 39' is preferably associated with each test wheel arrangement 1, a drive unit in each case being connected by way of a drive shaft 27 to a shaft section 5. By way of the drive unit electric motors 41 provided on the test bench, a test wheel arrangement 1, or its shaft section 5, can be dragged in rotational movement or braked. FIG. 4 shows, as mentioned, a drive unit 39' which is external to the vehicle and has a shiftable coupling 43 which is provided between the drive shaft 27 and the electric motor 41, the electric motor 41 being suitable for drag operation of the vehicle. The drive unit 39' further has a braking device, which is provided for producing a braking operation. In that manner, drag operation can be covered using electric motors of comparatively small size, and the higher braking power can be ensured by the braking device.

It is additionally conceivable to provide the drive unit 39 or 39' with noise encapsulation, that is to say with a noise-damping housing, in order to avoid disruptive noise from the electric motor 41 and/or the eddy-current brake 45, which can impair the test operation.

With the use of a suitable adjustment, the test wheel arrangement 1 is also suitable for simulating cornering. The wheels can be locked independently of the load case, and the outer connecting shafts, that is to say the drive shafts 27, perform the same movements as the drive shafts of a vehicle driven with front-wheel drive. The different wheel speeds to be produced can be calculated from the angle of steering lock and the corresponding curve radius. In braking operation, it is additionally conceivable for the electric motor 41 of the drive unit 39 or 39' to be used as a generator and for the electrical energy obtained to be fed back into stores provided in the test bench or the vehicle.

Instead of the electric motor 41, the external drive unit 39 or 39' can also have a hydraulic machine which is controlled from the test bench and can then be used both for drag operation and for braking operation.

Figure 6:
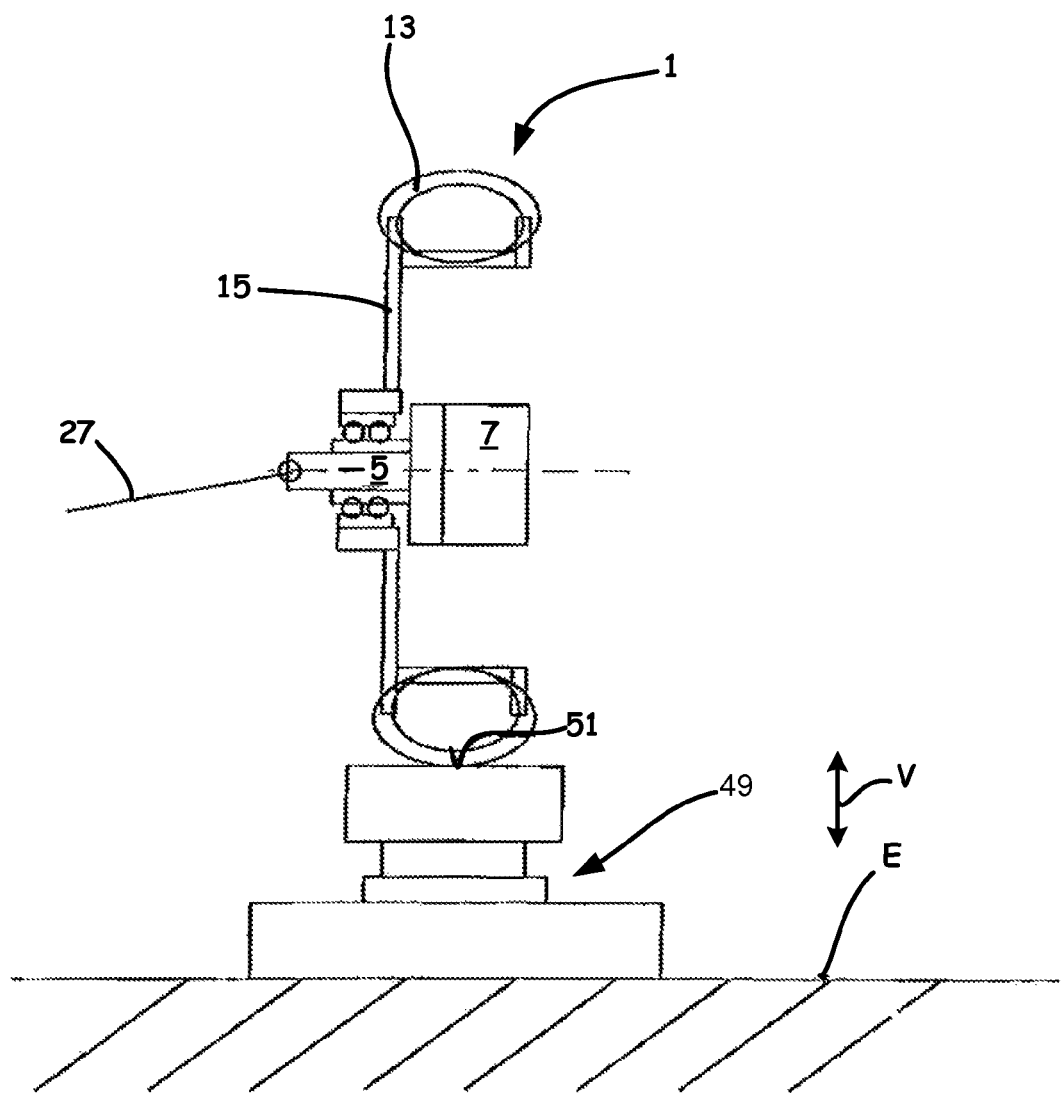
FIG. 6 shows a section through a test wheel arrangement cooperating with an external actuator.

FIG. 6 shows a schematic sectional representation of a test wheel arrangement 1 which cooperates with an actuator 49. The actuator is so configured and arranged that it is suitable for simulating travel on rough terrain, that is to say for simulating "rough-road travel". To that end, the actuator cooperates with the test wheel 3 in such a manner that a force, and especially pulse-like forces, is/are coupled into the vehicle by way of the contact surface 51 of the tyre 13 of a test wheel 3. The forces are consequently coupled into the test wheel 3 in a vertical direction V, which is perpendicular to the plane of the floor E. The actuator 49 can be electric, hydraulic or pneumatic. Travel on an uneven road can thus be simulated by an action of the actuator 49 in the direction V. Depending on the degree of the desired unevenness, the actuator 49 can introduce forces of different strengths into the test wheel arrangement 1. It will be appreciated that the actuator cooperates with a corresponding control device in order to introduce a desired sequence of force pulses into the vehicle.

Figure 7:
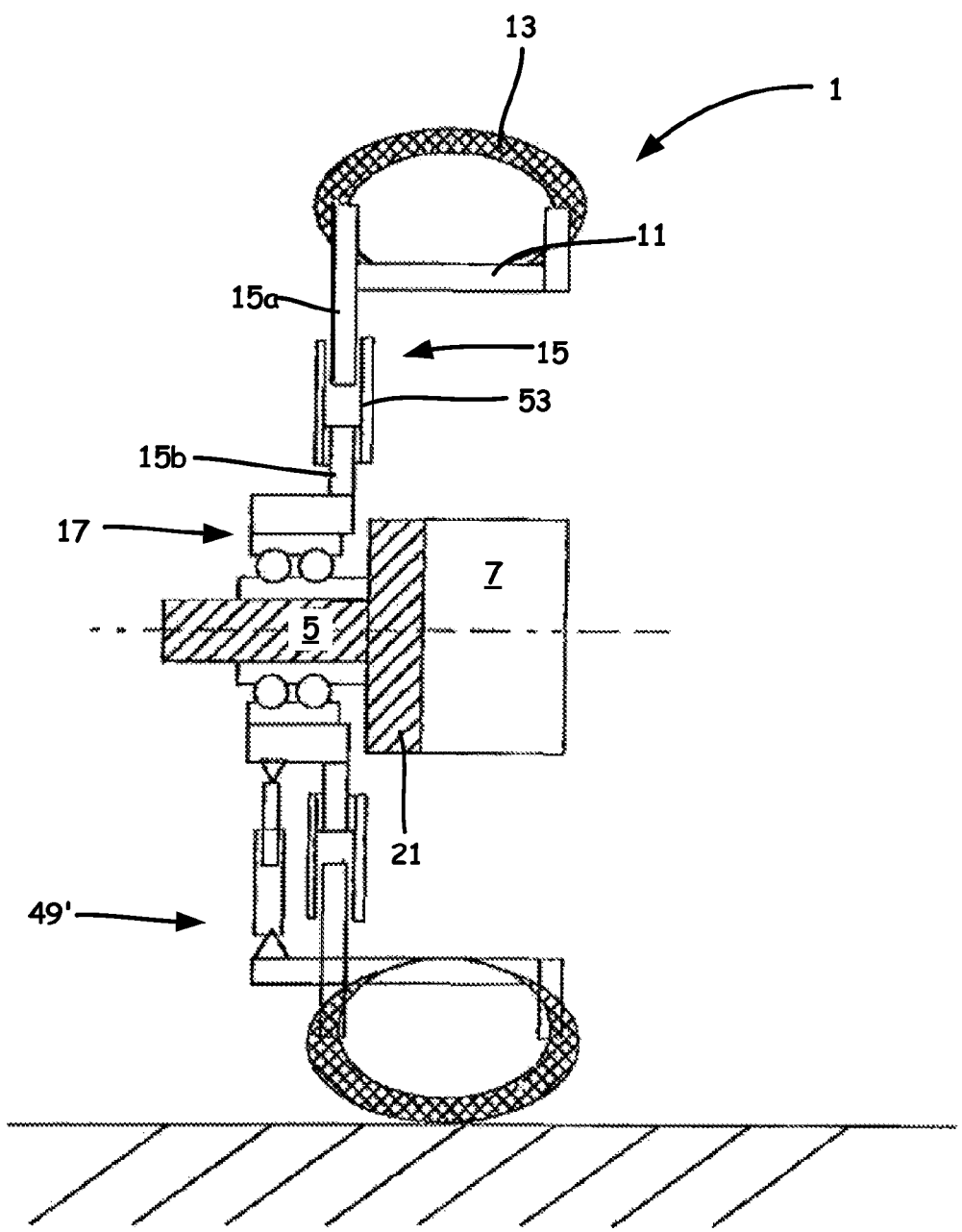
FIG. 7 shows a section through a test wheel arrangement having an integrated actuator.

FIG. 7 shows a further embodiment of a test wheel arrangement 1, which comprises an actuator 49' for simulating "rough-road travel". In contrast to the embodiment according to FIG. 6, the actuator 49' does not introduce forces into the contact surface 51 of the tyre 13, but the actuator 49' is, as it were, integrated into the test wheel arrangement 1 and introduces forces directly into the shaft section 5 by way of a part of the wheel disc 15.

According to the embodiment shown in FIG. 7, the test wheel 3 is in two parts. In particular, the wheel disc 15 has two wheel disc parts 15a and 15b which are arranged concentrically to one another, the two wheel disc parts being connected together by way of an annular rail or guide element 53 in such a manner that the radially internal wheel disc part 15b is displaceable relative to the radially external wheel disc part 15a, in a plane in which the wheel disc 15 is arranged. The displacement of the inner wheel disc part 15b relative to the outer wheel disc part 15a is controlled by way of the actuator 49', which engages on the one hand with the outer wheel disc part 15a and on the other hand with the radially internal wheel disc part 15b and especially is arranged or biased between those two parts, the actuator extending, as it were, in a radial direction of the test wheel 3. Because the internal wheel disc part 15b is connected to the shaft section 5, a displacement of that wheel disc part 15b causes a displacement of the shaft section 5. The actuator 49' has the effect of introducing a force only into the internal wheel disc part 15b, avoiding an action on the tyre 13 and the rim 11. The contact forces of the actuator act on those parts. The action on the internal wheel disc part 15b causes a displacement of the shaft section 5, as has been mentioned, as a result of which a simulation of "rough-road travel" is possible.

It should also be noted at this point that the outer ends of the axle legs, or components rigidly connected thereto, are preferably used as the reference measuring point for the accelerations that are established during driving operation, in order to couple authentic forces or pulses for rough-road simulation in test bench operation.

All the actuators of the type mentioned here can, as mentioned, be in the form of electrodynamic actuators. However, it is also conceivable to use hydraulic or pneumatic actuators.

Figure 8A:
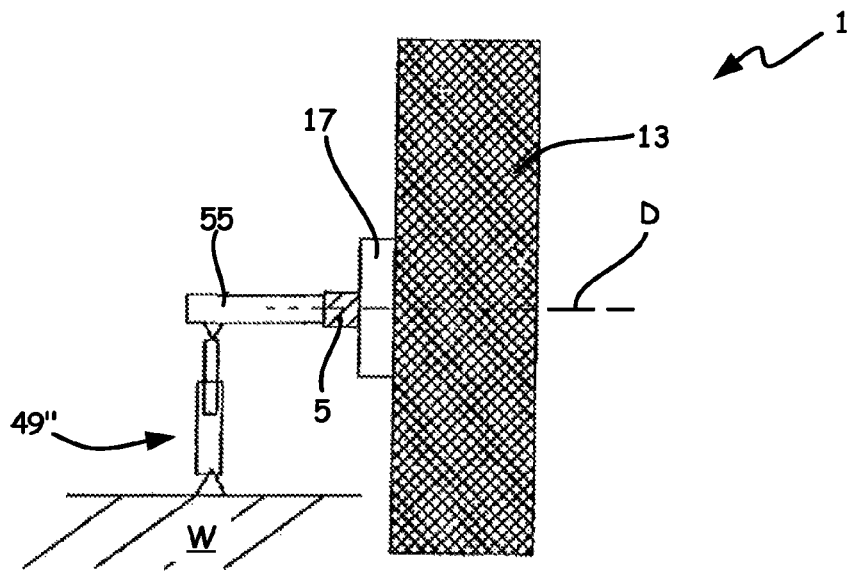
FIG. 8a shows a top view of a test wheel arrangement having an actuator for simulating a steering wheel moment of resistance.
Figure 8B:
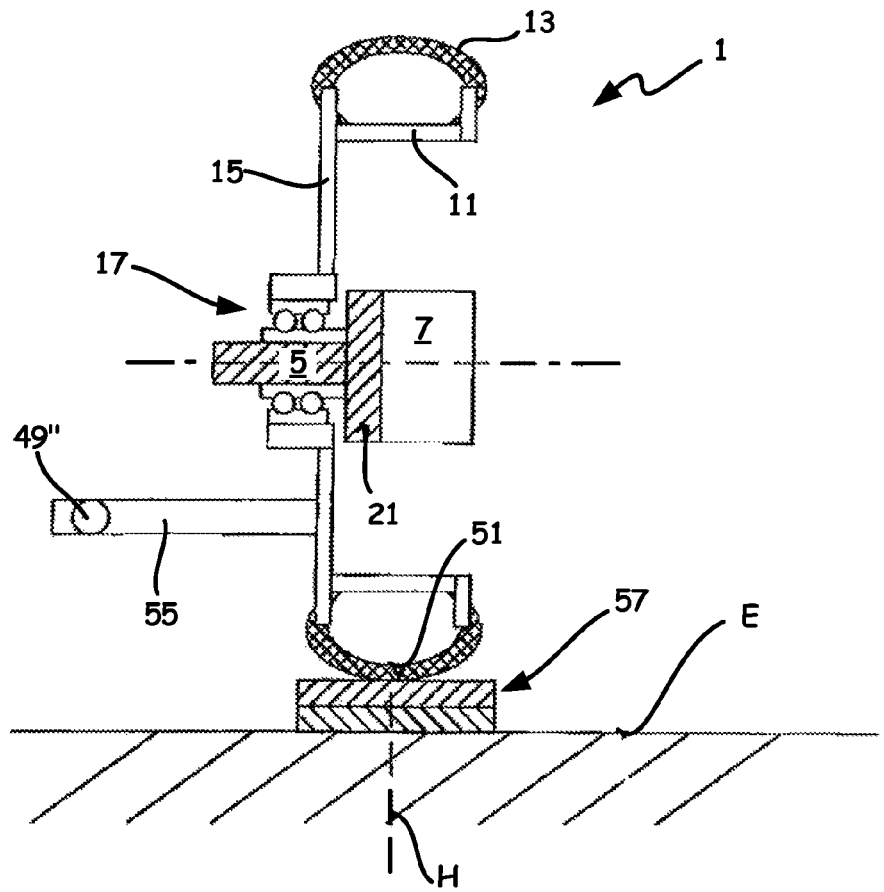

FIGS. 8a and 8b show a further embodiment of the invention, in which there is used for introducing or simulating steering moments of resistance an arrangement in which rotatable bearings are arranged beneath the tyre contact surfaces 51 of the driven road wheels. There is further provided a controllable or adjustable actuator, which cooperates with the test wheel arrangements 1 connected to the driven axle of a vehicle.

FIG. 8a shows a top view of a test wheel arrangement and an actuator 49" cooperating therewith. The actuator 49" abuts a wall region W with one end face and with its other end face abuts an arm element 55, which is preferably connected to the test wheel 3 and especially to the rim 11. The wall region W can be part of an actuator device, which also includes the actuator. It is conceivable to configure the actuator device to be displaceable, for example with rollers, and to position and fix it in the region of the motor vehicle during test operation. In particular, the actuator 49" is attached to the wall region W in such a manner that it protrudes substantially perpendicularly therefrom, that is to say is arranged substantially parallel to the floor. The arm element 55 preferably extends parallel to the axis of rotation D of the test wheel arrangement 1. The arm element 55 can be releasably connected, for example screwed or welded, to the test wheel 3, especially to the rim 11 or the wheel disc 15. In order to simulate a steering movement, the actuator introduces a force into the arm element 55 in such a manner that a rotation of the test wheel arrangement 1 is effected.

FIG. 8b shows a schematic sectional representation of the test wheel arrangement according to FIG. 8a. The figure shows that a rotatable bearing 57 is arranged between the plane of the floor E and the contact surface 51 of the tyre 13, which rotatable bearing 57 can be rotated by way of suitable means, especially by way of an electric motor, about an axis of rotation H, which is preferably substantially perpendicular to the plane of the floor E. On actuation of the actuator 49", which in FIG. 8b is arranged perpendicular to the plane of the drawing, a force is thus exerted on the test wheel 3, so that the test wheel arrangement 1 rotates about the axis of rotation H in order to simulate a steering movement. The actuator 49" can in turn be electrodynamic, hydraulic or pneumatic and can couple the desired steering moments of resistance into the test wheel arrangement 1 in dependence on the travelling speed, the steering angle and the steering angle arrangement.

It should be mentioned at this point that the test wheel arrangement 1 can be provided with an outer covering (not shown here), namely a hub cap, by means of which the aerodynamic resistance of the test wheel arrangement 1 is optimised in order to avoid undesirable air turbulence, especially in the case of wind tunnel measurements.

FIGS. 8a and 8b show that the test wheel arrangement 1 according to the invention also permits the simulation of steering movements. These are compensated for by the drive shafts 27 and accordingly cannot cause slipping of tyres on a track. The test wheel arrangement 1 is accordingly also suitable, with the use of an appropriate adjustment, for the simulation of cornering. The wheels can be locked independently of the load case, and the outer drive shafts execute the same movements as the drive shafts of a vehicle driven by means of a front- and/or rear-wheel drive. The different wheel speeds of the test wheel arrangements 1 and especially of the shaft sections 5, which are to be set by the drive units, are given by the angle of steering lock and the corresponding curve radius.

Figure 9:
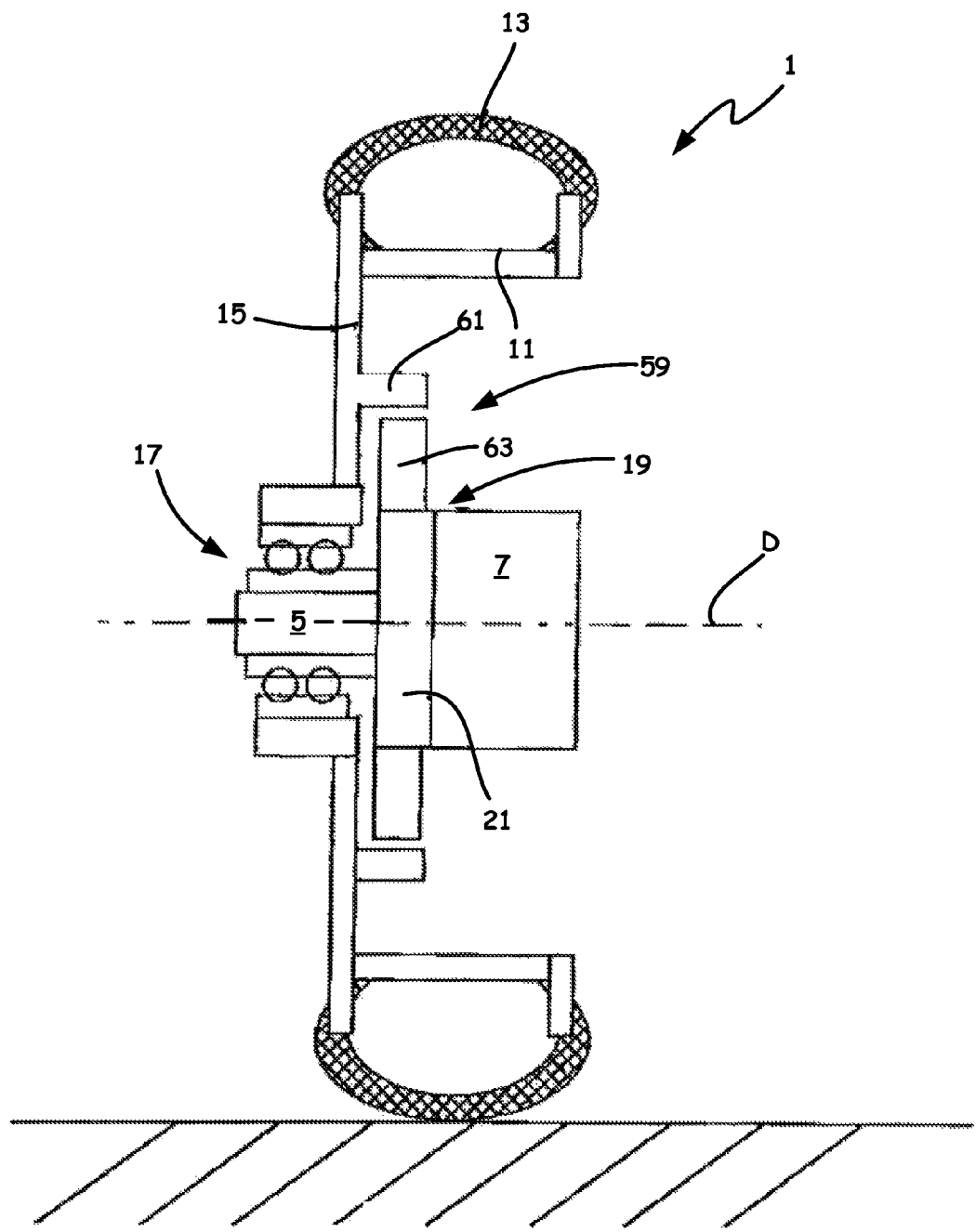
FIG. 9 shows a schematic sectional representation of a test wheel arrangement having an integrated drive unit.

FIG. 9 shows a section through a test wheel arrangement 1 according to a further embodiment of the invention. Instead of an external drive unit 39 or 39', there is provided an internal drive unit 59, which preferably is in the form of an electric motor and is integrated into the test wheel arrangement 1. The drive device 59 has a radially external annular element 61, which is arranged on the test wheel 3 and especially on the side of the wheel disc 15 facing the wheel hub 7. The internal drive unit 59 further comprises a radially internal annular element 63, which is arranged on the shaft section 5 or, as shown in FIG. 9, on the adapter 19 and especially on the adapter plate 21. The radially external annular element 61 and the radially internal annular element 63 are arranged coaxially to one another and form an air gap between them. They cooperate in such a manner that, depending on the desired use of the internal drive unit, either the radially internal element 63 or the radially external element 61 forms the rotor of the internal drive unit 59.

For example, in order to drive the shaft section 5 about the axis of rotation D and accordingly the vehicle axle, the radially internal element 63 can act as the rotor (test bench operation), while the radially external element 61 acts as the stator. At the same time, however, it is conceivable to operate the internal drive unit 59 as a wheel hub motor, in such a manner that the radially external element 61 can be operated as the rotor, so that the test wheel 3 thus rotates relative to the stationary shaft section 5 (shunting operation).

The integrated drive unit 59 additionally comprises connection means (not shown in FIG. 9) to a control or adjusting circuit and to a power supply device. Like the external drive device 39, 39', the internal drive unit 59 permits, for test operation, rotation of the shaft section 5, the wheel hub 7 and accordingly the vehicle axle about an axis of rotation D, the test wheel 3 being stationary owing to the rotatable connection by way of the bearing 9. It is particularly advantageous that the vehicle to be tested brings its own electric motor into the test area, where at most start up must then be provided.

Figure 10:
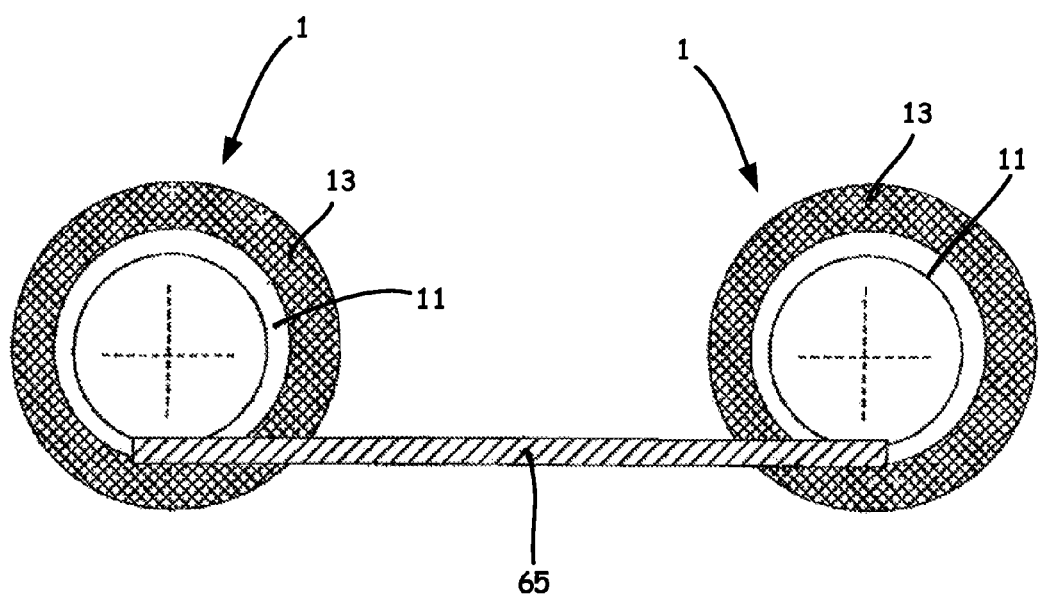
FIG. 10 shows a schematic representation of a fixing device for fixing two test wheel arrangements according to the invention.

FIG. 10 shows two test wheel arrangements 1 which are connected to a vehicle (not shown) on one side of the vehicle in place of the normal road wheels. There is further provided a fixing device 65, which prevents the vehicle from rolling away when the test wheel arrangements 1 are used, especially with an integrated drive unit 59. This is achieved in that the front and rear wheels of at least one side of the vehicle are connected together by the fixing device 65. In particular, their test wheels 3 or the rims 11 are connected with the fixing device 65, which is preferably in the form of a rod-like element which is at a distance from the ground and extends along the vehicle in such a manner that the doors can still be opened. It will be appreciated that the fixing device 65 can in principle also be used during operation of the test wheel arrangement 1 by means of the drive unit 39 or 39'. By means of the fixing device 65, the required peripheral hardware of the test bench is reduced to a minimum. In particular, extensive armouring in the floor of the test area, which is conventionally required for fixing the vehicle, is eliminated. Even damage to the bearing of the test wheel arrangement 1 is reliably avoided especially when using the internal drive unit 59.

Figure 11:
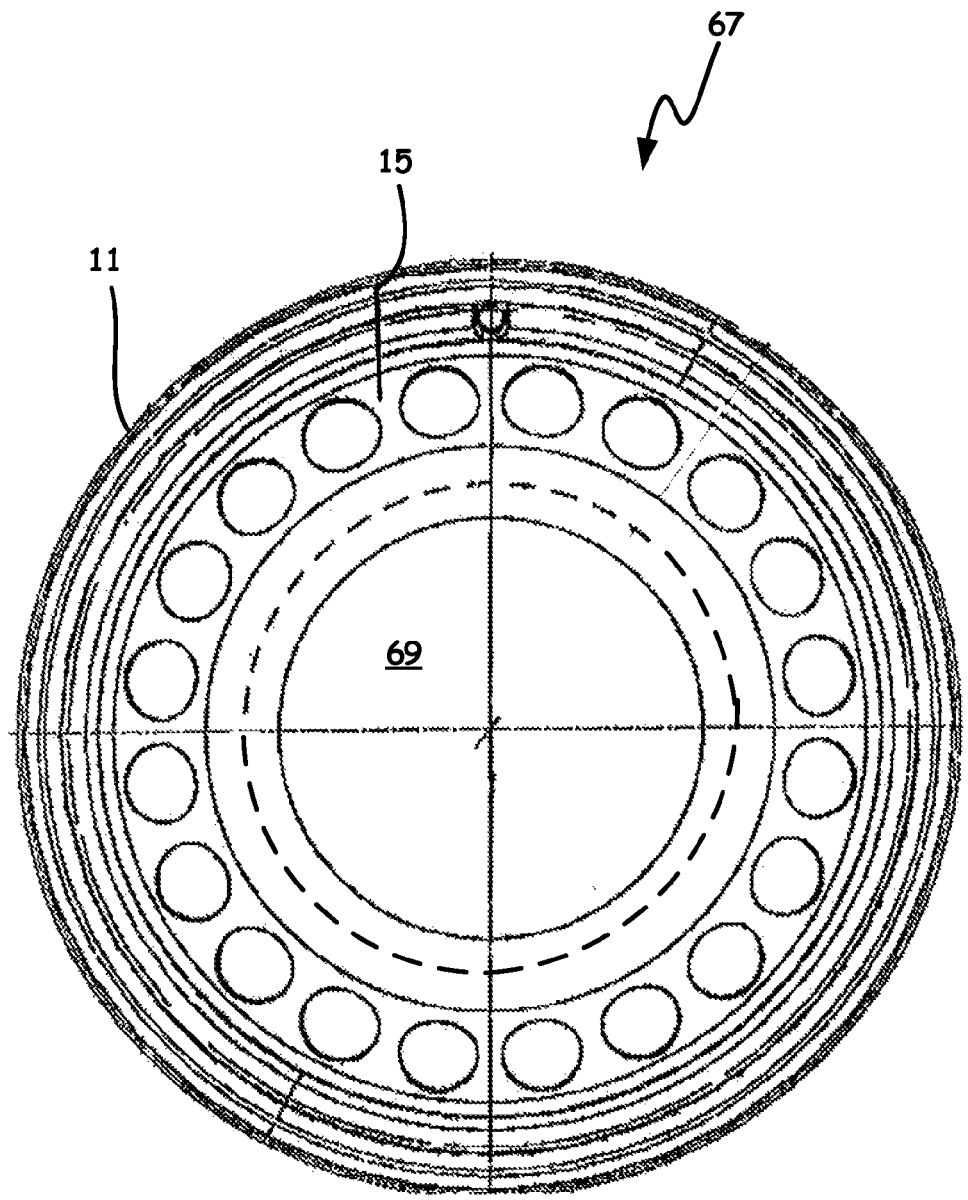
FIG. 11 shows a schematic top view of the part of a test wheel of a test wheel arrangement according to the invention.

A concrete exemplary embodiment of the test wheel arrangement 1 is explained in greater detail below with reference to FIGS. 11 to 20. The test wheel arrangement 1 can be produced using a conventional wheel 67, which has a rim 11 and a wheel disc 15 as well as a tyre 13 (not shown here). FIG. 11 shows that a part of the wheel disc 15 is removed, especially sawn out, punched out or cut out, so that the wheel disc has a circular opening 69. A substantially circular wheel disc insert 17 shown in FIG. 12 can be inserted into the circular opening 69 and connected, especially welded, to the wheel disc 15.

Figure 13:
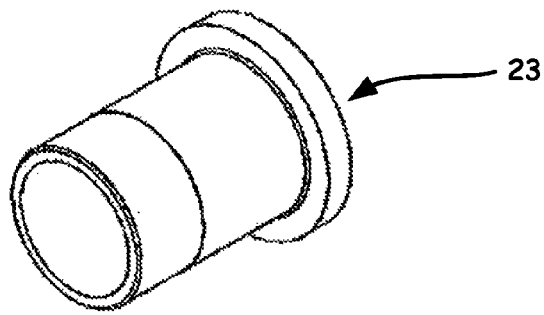
FIG. 13 shows a perspective representation of a bearing sleeve.
Figure 14:
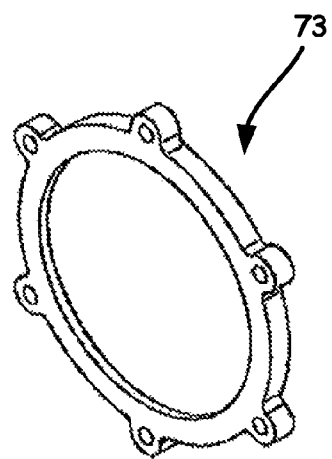
FIG. 14 shows a perspective representation of a bearing biasing ring.

The wheel disc insert 17 serves to receive a bearing (not shown in the figure), especially a roller bearing, which with its inner bearing ring can be fastened, especially is shrunk or welded, on a bearing sleeve 23 shown in FIG. 13. The opening 71 of the wheel disc insert 17 serves to receive the outer bearing ring of the bearing 9 connected to the bearing sleeve 23, which can readily be seen especially in FIG. 1. In order to bias and secure the bearing in the opening 71 there can be provided a bearing biasing ring 73, as shown in FIG. 14, which can be inserted into an appropriately formed recess on an end face of the wheel disc insert 17.

Figure 15:
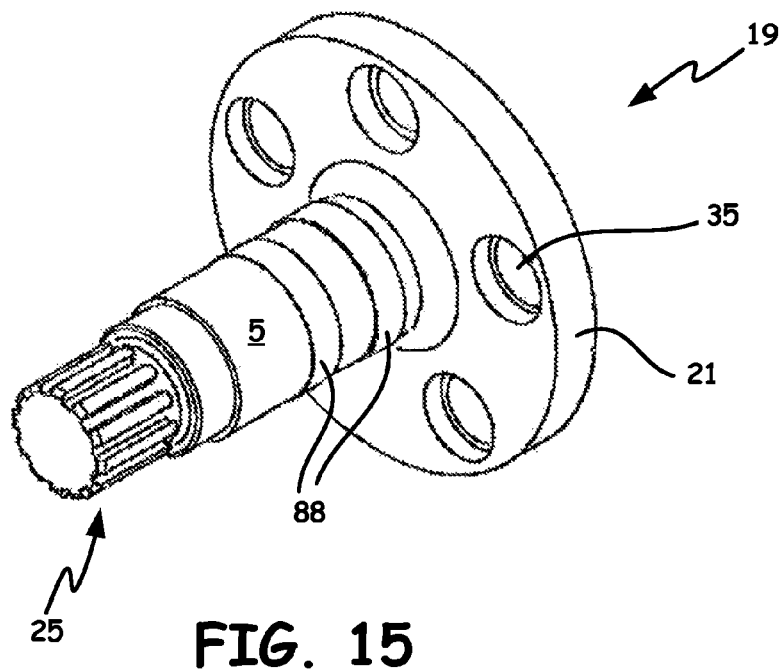
FIG. 15 shows a perspective representation of an adapter with shaft section.

FIG. 15 shows a perspective representation of the adapter 19 with the shaft section 5 and the coupling region 25 as well as with the adapter plate 21. Clearly visible in FIG. 15 are the through-bores 35 of the adapter plate 21, which are used for fastening the adapter 19 to a wheel hub 7 (not shown in the figure).

FIG. 15 further shows that the coupling region 25, for connection of the shaft section 5 to the drive shaft 27, can have a (shaft) toothing, especially a ground splined shaft portion, for producing a rotary connection between the shaft section 5 and a drive and/or braking unit.

If the test wheel arrangement 1 is to be used for preparing a motor vehicle for the testing of various running properties by way of at least one wheel axle, the normal road wheel of a passenger car is first removed and then the shaft section 5 is attached to the wheel hub 7 of the motor vehicle. Independently of the mounting of the shaft section 5 on the wheel hub 7 of the motor vehicle, only then is the test wheel 3 fastened to the shaft section 5, in such a manner that the test wheel 3 is mounted on the shaft section 5 to be freely rotatable. For that purpose, the bearing sleeve 23, together with the test wheel 3 and the rotary bearing located inbetween, is pushed onto the shaft section 5.

Figure 16:
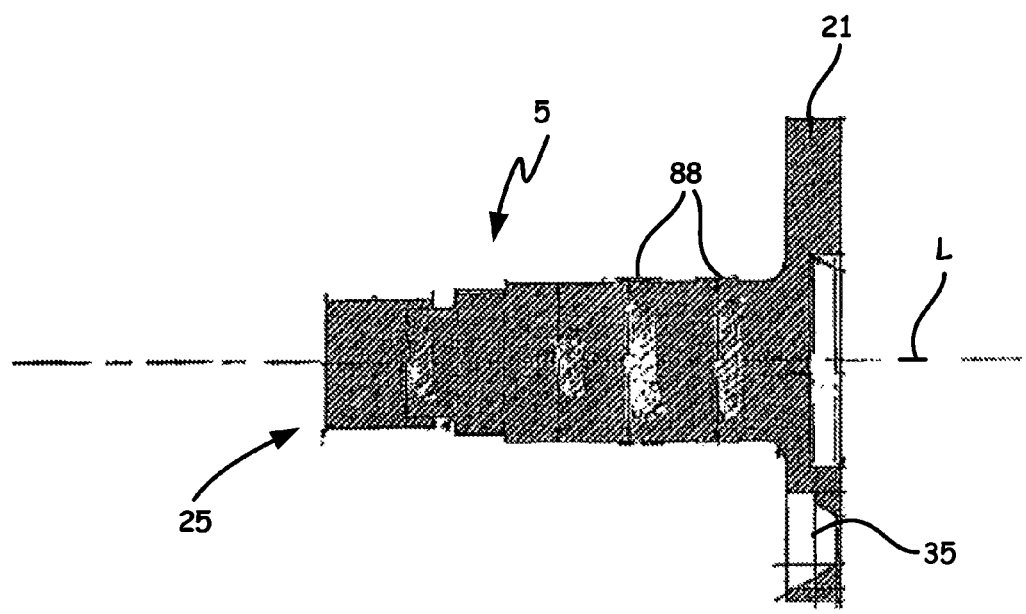
FIG. 16 shows a sectional representation of the adapter according to FIG. 15.

In order to prevent the bearing sleeve 23 and the shaft section 5 from becoming wedged together so that the connection between those two elements may no longer be releasable, it is advantageous for a clearance fit to be produced between the bearing sleeve 23 and the shaft section 5. According to the present exemplary embodiment, as is shown in FIG. 16, this is achieved in that the shaft section 5 has, in regions, different diameters in the direction of its longitudinal centre axis L, that is to say in the axial direction of the shaft section 5, the largest diameter of the shaft section 5 preferably being no larger than the smallest inside diameter of the bearing sleeve 23. The zones of the larger shaft diameter are identified with the reference numeral 88 in FIG. 15, 16.

An exemplary embodiment of the device 29 for blocking the rotary mounting between the test wheel 3 and the shaft section 5 is discussed below.

In the exemplary embodiment according to FIGS. 17 to 19 of the device for blocking a rotary mounting between the test wheel 3 and the shaft section 5, the device comprises a three-armed flange 75, which is connected in a rotationally secure manner on the one hand to a resilient intermediate element, which is formed especially by a flexible disc, and on the other hand to the shaft section 5. For the rotationally secure connection to the shaft section 5, the three-armed flange 75 has an opening 77, the inner profile of which is configured to receive the outer profile of the coupling region 25 of the shaft section 5 in such a manner that a rotationally secure connection between those two elements is obtained when the opening 77 of the three-armed flange 75 is pushed onto the coupling region 25 of the shaft section 5. The flange and the coupling region are then connected together by an interlocking connection. Instead of a three-armed flange 75, a two- or five-armed flange could also be used. A plate-like flange would in principle also be conceivable.

Figure 12:
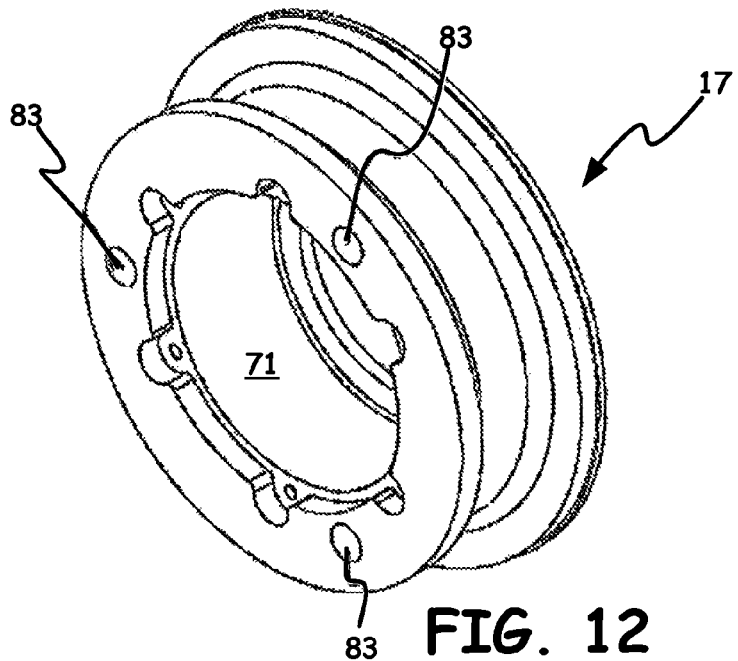
FIG. 12 shows a perspective representation of a part of the wheel disc insert according to the invention.

For connection of the claw-like three-armed flange 75 to the said flexible intermediate element, a through-bore 79 is provided in each arm, through which corresponding connecting elements for connecting the three-armed flange 75 to the intermediate element can be guided. FIG. 18 shows a locking pin 81 which can be introduced into the openings 83 of the wheel disc insert 17 which are shown in FIG. 12 in such a manner that the intermediate element can be fitted with corresponding openings onto the locking pin section 81*a* and held thereon by corresponding securing means.

FIG. 19 shows a test wheel arrangement 1 having a wheel rim 11, a wheel disc 15, a wheel disc insert 17 and an activated device 29 for blocking a rotary mounting between the test wheel 3 and the shaft section 5 (not visible in FIG. 19). It is clear that the resilient intermediate element 85 preferably has six bores, three of the bores being connected to the locking bolts 81 according to FIG. 18 and consequently to the test wheel 3, while the other three bores are connected to the three-armed flange according to FIG. 17 in such a manner that a rotary mounting between the test wheel 3 and the shaft section 5 is blocked. The resilient intermediate element 85 thereby avoids double centreing and ensures damping between the shaft section 5 and the test wheel 3. FIG. 19 further shows that the resilient intermediate element is arranged between the flange, which moreover can have more or fewer than three arms, and the test wheel.

It should also be pointed out at this point that the test wheel can have almost any desired size, but 16" steel wheels are particularly preferably used because they can be mounted on a particularly large number of vehicle types. Moreover, the wheel disc insert 17 can be connected to the wheel disc 15 in such a manner that it is displaceable relative thereto in an axial direction of the wheel, for example by way of a thread or a similar mechanism.

Figure 20:
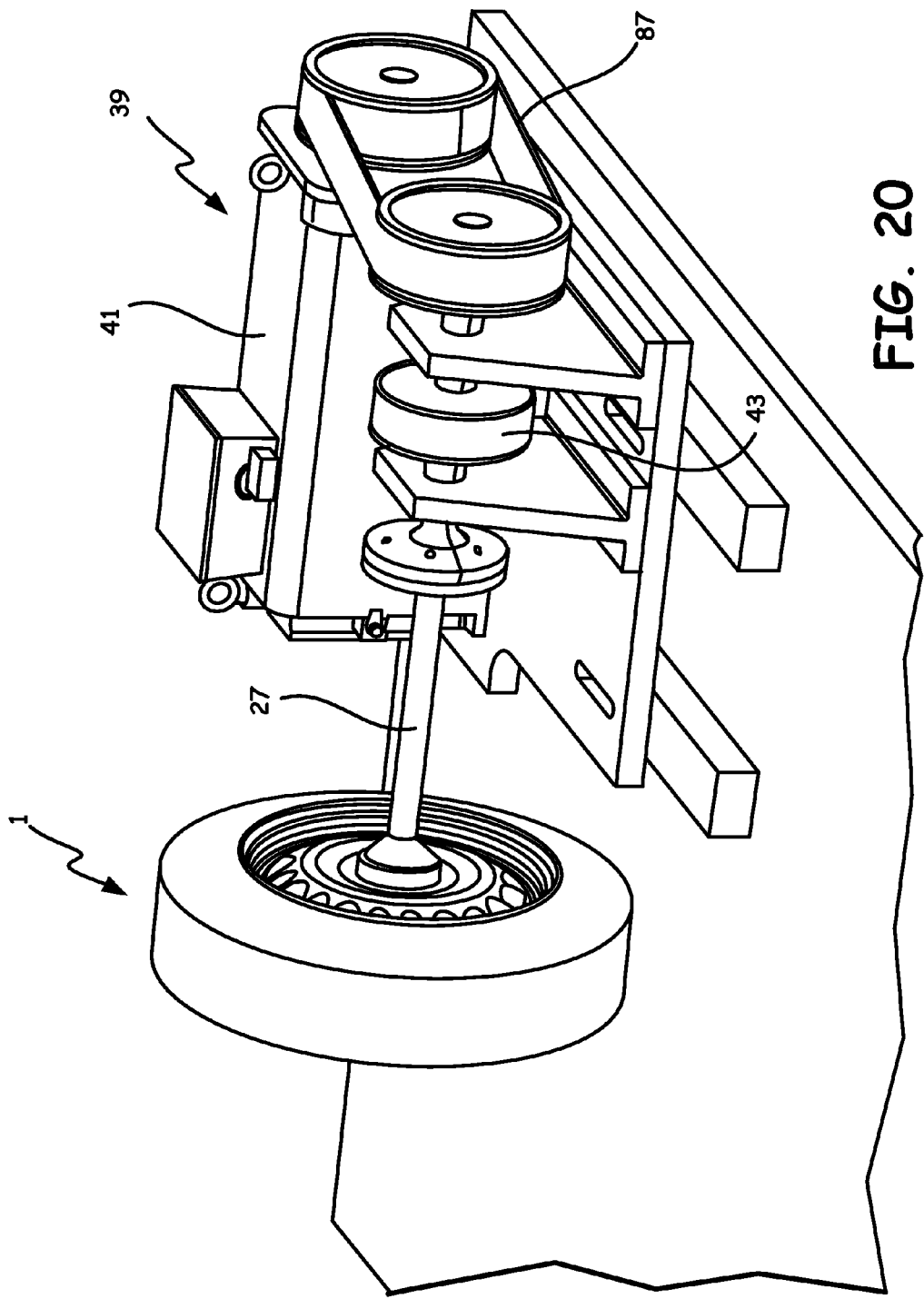
FIG. 20 shows a perspective representation of a test wheel arrangement having an attached external drive unit according to the invention.

FIG. 20 further shows a perspective representation of an exemplary overall arrangement of the test wheel arrangement 1 with an external drive unit 39, the test wheel arrangement 1 being connected by way of the drive shaft 27 to a coupling 43, which especially is in the form of a safety coupling, by way of a belt 87 to an electric motor. Such a drive unit is preferably associated with each test wheel arrangement 1. As mentioned, the drive unit can be provided with noise encapsulation so that measurements of the vehicle acoustics can be taken without interfering noise from the electric motor. Likewise, a driving profile recorded during actual road travel can be reproduced on the test bench. All parameters such as speed, engine load, gear selection, steering angle, rough-road conditions, etc, can thereby be taken into account.

In order to carry out a test operation or a vehicle test, it is preferably provided that an adjustment device (not shown) on the test bench has access to all the measured and control variables on the vehicle and on the test bench, that is to say on the test wheel arrangements 1 and the drive and braking units. The adjustment device preferably sets constant engine speeds. However, it is also conceivable, in dependence on the selected gear, for vehicle speeds with a defined load, which varies between full load and drag operation, to be set. Furthermore, the adjustment device can preferably set and run through defined load and speed ramps for the production of operating maps. Moreover, for the simulation of cornering, it can preferably automatically calculate the corresponding curve radius and the resulting speed differences between the left and right wheels from the angle of steering lock, and set the external or internal drive units accordingly. In addition, it can also be provided in test operation that the adjustment device on the test bench and a monitoring and measuring system for dynamic data communicate interactively and exchange data relating to the adjustment, the analysis and the storage of such data in real time or at least promptly. The data of the type mentioned above can be, for example, temperatures, pressures, vibrations, noise, vehicle and engine CAN bus data, etc.

Various application examples of the invention are discussed in greater detail below with reference to different test operations. The starting situation for each test operation is a motor vehicle arranged in a test area, the normal road wheels of which have been replaced by two or four test wheel arrangements 1 (depending on whether the vehicle has a front-/rear-wheel drive or a four-wheel drive). Each test wheel arrangement 1 further has an associated drive and/or braking unit 39, 39', 59.

A first exemplary test operation relates to a dragged operating state of the vehicle drive train. The entire drive train, that is to say the engine, the gears and the drive shaft, of the test vehicle is driven (dragged) by the electric motors and especially the asynchronous motors of the external drive units. To that end, the blocking between the test wheel 3 and the shaft section 5 of each test wheel arrangement 1 must first be released so that the shaft section 5 is mounted to be rotatable relative to the test wheel 3. The internal combustion engine of the motor vehicle is then first operated at idle without a gear selected. The vehicle coupling can then be opened and a gear selected. If the vehicle coupling is then closed, the drive axle of the vehicle rotates. Because the shaft sections 5 are connected to the drive axle by way of the wheel hubs 7, the shaft sections 5 of the test wheel arrangements 1 also rotate at the speed given by the engine idling and the gear ratio. That wheel hub speed in turn corresponds to a travelling speed. On account of the rotary mounting between the shaft section 5 and the test wheel 3, the test wheel remains stationary, while the shaft section rotates.

If the speed after opening of the vehicle coupling is, for example, 1000 revolutions per minute ($\text{min}^{-1}$) and the drive train is to be "dragged up" from an engine speed of 1000 $\text{min}^{-1}$ to 4000 $\text{min}^{-1}$ with an acceleration of 100 $\text{min}^{-1}/\text{s}$, the adjustment device on the test bench sets the required drag power at all the drive units 39 and 39' as a function of time. This means, therefore, that the drive units and especially their electric motors bring about, by way of the drive shafts 27, a correspondingly higher speed of the shaft sections 5 and accordingly of the drive shaft of the motor vehicle.

By means of the above-described test operation, a dragged operating state of the motor vehicle corresponding to a downhill drive is simulated by action on the shaft sections 5 by means of the drive units. Consequently, reproducible speed ramps can be driven without noise of combustion from the internal combustion engine. Furthermore, audible engine orders can be analysed in their acoustically most critical occurrences, because they are not masked by noise of combustion. For example, in an engine having the following construction data, an audible order can be attributed to the causal group of components: With 23 teeth on the drive pinion for the camshaft chain, 25 teeth for the oil pump chain and a coolant compressor which has 6 cylinders, a transmission ratio of 1.5, a ninth engine order and its overtones can be simulated.

A further exemplary test operation is braked operation for vehicle testing. For analysis of the heat management in the engine space in particular, reproducible load operation is required. For simulating an uphill drive in summer with a trailer, discrete operating points or even operating cycles can be defined. These can be triggered by actuating an accelerator pedal robot 47 placed in the vehicle, as shown in FIG. 5, in conjunction with the eddy-current brakes 45 integrated into the drive unit 39' external to the vehicle.

A further exemplary test operation is simulated cornering, as is used, for example, in the development of power steering pumps. Cornering can be set by separately regulating the speed of the vehicle-external drive units of the two drive tracks. The corresponding curve radius and the associated speed differences of the wheels can be calculated from the angle of steering lock. The described concept of free-running shaft sections 5 assists simulated cornering in dragged and in braked engine operation.

A further application is "rough-road simulation", that is to say the simulation of driving with the vehicle on hilly or at least uneven terrain. As mentioned, the test wheel arrangement according to the invention also permits pulsed operation for simulating rough-road travel by means of suitable actuators. Using the methods known from flat-track test benches, track profiles of defined roughness can be reproduced on the test bench. The interaction of the travelling speed, that is to say the speed of the shaft section 5, and the frequency of the pulses coupled in by means of the actuators is important for the adjustment. The linear actuators for coupling in the pulses can be implemented in the anchoring of the wheel fixing on the floor of the test bench and be designed as an under-floor structure or in the form of a platform, as shown in FIG. 6.

Overall, it is accordingly found that, with a low structural outlay, the present invention permits vehicle testing operation for many different vehicle types which supports the typical applications of a roller test bench. In particular, a load defined by braking and/or drag operation can be achieved with variable engine speed and travelling speed.

Moreover, changes in the noise development as compared with road operation do not cause any additional noise—typical noise components of actual road travel are eliminated but can be added subsequently electronically. For the use of the invention to measure the drive acoustics of a motor vehicle, individual or a plurality of acoustic components can be added. If the measurement is carried out in a wind tunnel, wind noise, for example, can be added, which can optionally be determined separately. Engine and aggregate noise can further be detected. As mentioned, rolling noise of the normal road wheels which has actually been recorded or has been produced electronically can be added to that noise. The addition of further acoustic components not mentioned specifically here is further conceivable. In that manner, a complete acoustic driving profile of a motor vehicle can be prepared by means of the stationary test wheels.

The test arrangements according to the invention further allow a vehicle to be fitted easily with the test wheel arrangements according to the invention and, as a result, permit rapid vehicle change in the test area, especially in a wind tunnel or the like. Furthermore, gentle and safe behaviour of the vehicle in the test area is ensured even in the case of steering movements.

LIST OF REFERENCE NUMERALS

1 test wheel arrangement
3 test wheel
5 shaft section
7 wheel hub
9 (roller) bearing
11 rim
13 tyre
15 wheel disc
15a radially external wheel disc section
15b radially internal wheel disc section
17 wheel disc insert
19 adapter
21 adapter plate
23 bearing sleeve
25 coupling region
27 drive shaft
29 device for blocking
31 rod-like element
33 fastening means
35 through-bore
39 drive unit
39' drive unit
41 electric motor
43 shiftable coupling
45 eddy-current brake
47 accelerator pedal robot
49 actuator
49' actuator
49" actuator
51 tyre contact surface
53 annular rail element
55 arm element
57 bearing
59 internal drive unit
61 radially external element
63 radially internal element
65 fixing device
67 wheel
69 circular/cylindrical opening
71 opening
73 bearing biasing ring
75 three-armed flange
77 opening
79 through-bore
81 locking pin
81a locking pin end
83 opening
85 resilient intermediate element
87 belt
88 zones of larger diameter
H axis of rotation
D axis of rotation
L longitudinal centre axis
W wall region
E floor plane

The invention claimed is:

1. A test wheel arrangement for testing a motor vehicle while its tires are stationary, comprising:
   a shaft section configured to be connected to a wheel hub of a motor vehicle and on which a test wheel is mounted to be freely rotatable; and
   a device for blocking a rotary mounting between the test wheel and the shaft section, the device including a resilient intermediate element and a flange having multiple arms each connected to the resilient intermediate element, the resilient intermediate element being connected in a rotationally secure manner to the test wheel, and the flange being connected in a rotationally secure manner to the resilient intermediate element on a first side of the flange and to the shaft section on a second side of the flange.

2. The test wheel arrangement according to claim 1, wherein
   the test wheel is configured to be mounted on the wheel hub independently of the mounting of the shaft section thereon.

3. The test wheel arrangement according to claim 1, wherein
   the shaft section is part of an adapter plate which is configured to be attached to the wheel hub.

4. The test wheel arrangement according to claim 1, wherein
   a drive shaft, which is a flexible drive shaft or a universal joint shaft, is configured to be attached to the shaft section to produce a rotary connection.

5. The test wheel arrangement according to claim 1, wherein
   the shaft section is connected to the test wheel by way of a roller bearing.

6. The test wheel arrangement according to claim 5, wherein
   the roller bearing is arranged in a wheel disc insert which at least partially replaces a wheel disc of the test wheel.

7. The test wheel arrangement according to claim 6, wherein
   the roller bearing within the wheel disc insert has a selected diameter that is independent of the diameter of the wheel hub.

8. The test wheel arrangement according claim 6, wherein the wheel disc insert has a bearing sleeve, the inside diameter of which is adapted to the diameter of the shaft section in such a manner that a clearance fit is produced.

9. The test wheel arrangement according to claim 1, wherein
   the test wheel arrangement cooperates with at least one integrated or external actuator to simulate travel on uneven terrain and/or to simulate a steering movement.

10. The test wheel arrangement according to claim 9, wherein
    an actuator integrated into the test wheel arrangement is so arranged to effect a relative displacement of two wheel disc parts arranged concentrically to one another, in such a manner to introduce a force into the shaft section.

11. The test wheel arrangement according to claim 9, wherein
    the at least one integrated or external actuator is electric, hydraulic or pneumatic.

12. The test wheel arrangement according to claim 1, further comprising an integrated drive unit for carrying out a driving operation and/or a test operation.

13. A method of using the test wheel arrangement according to claim 1 for measuring the drive acoustics of a motor vehicle, wherein
    the measurement takes place in a wind tunnel, and wind noise is determined,
    engine noise and aggregate noise is further detected and superimposed on the wind noise to produce a total noise, and
    rolling noise which has been measured or which has been simulated is added to the total noise.

14. The test wheel arrangement according to claim 1, wherein the flange has an inner opening configured to receive an outer profile of the shaft section and has two, three or five arms extending from the inner opening that are each connected to the resilient intermediate element.

15. The test wheel arrangement according to claim 1, wherein each arm of the flange is connected to the resilient intermediate element via through-bores provided in each arm of the flange.

16. A method for preparing a motor vehicle for the testing of various running properties by way of at least one wheel axle, comprising:
    removing a road wheel;
    attaching a shaft section to the wheel hub of the motor vehicle;
    fastening a test wheel to the shaft section in such a manner that the test wheel is freely rotatably mounted on the shaft section; and
    blocking a rotary mounting between the test wheel and the shaft section with a device that includes a resilient intermediate element and a flange having multiple arms each connected to the resilient intermediate element, the resilient intermediate element being connected in a rotationally secure manner to the test wheel, and the flange being connected in a rotationally secure manner to the resilient intermediate element on a first side of the flange and to the shaft section on a second side of the flange.

17. The method according to claim 16, further comprising:
    attaching the shaft section by way of an adapter element, comprising an adapter plate, to the wheel hub of the motor vehicle, the shaft section forming part of the adapter element.

18. The method according to claim 16, further comprising:
    fastening the test wheel to the shaft section by way of a roller bearing.

19. The method according to claim 16, further comprising:
    producing a rotary connection between the shaft section and a drive shaft.

20. The method according to claim 16, wherein blocking the rotary mounting between the test wheel and the shaft section is performed by the device that includes the resilient intermediate element and the flange, wherein the flange has an inner opening configured to receive an outer profile of the shaft section and has two, three or five arms extending from the inner opening that are each connected to the resilient intermediate element.

21. The method according to claim 16, wherein blocking the rotary mounting between the test wheel and the shaft section is performed by the device that includes the resilient intermediate element and the flange, wherein the each arm of the flange is connected to the resilient intermediate element via through-bores provided in each arm of the flange.

* * * * *